(12) United States Patent
Zhang et al.

(10) Patent No.: US 10,784,938 B2
(45) Date of Patent: Sep. 22, 2020

(54) DATA PROCESSING METHOD AND APPARATUS

(71) Applicant: ZTE CORPORATION, Guangdong (CN)

(72) Inventors: Shujuan Zhang, Guangdong (CN); Yu Ngok Li, Guangdong (CN); Yuhong Gong, Guangdong (CN); Wenhao Liu, Guangdong (CN); Yijian Chen, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 211 days.

(21) Appl. No.: 15/774,088

(22) PCT Filed: Aug. 17, 2016

(86) PCT No.: PCT/CN2016/095726
§ 371 (c)(1),
(2) Date: May 7, 2018

(87) PCT Pub. No.: WO2017/076102
PCT Pub. Date: May 11, 2017

(65) Prior Publication Data
US 2018/0316406 A1 Nov. 1, 2018

(30) Foreign Application Priority Data
Nov. 6, 2015 (CN) .......................... 2015 1 0752412

(51) Int. Cl.
*H04B 7/06* (2006.01)
*H04L 25/02* (2006.01)
(Continued)

(52) U.S. Cl.
CPC ......... *H04B 7/0626* (2013.01); *H04B 7/0452* (2013.01); *H04L 5/0051* (2013.01);
(Continued)

(58) Field of Classification Search
CPC . H04B 7/0452; H04B 7/0626; H04L 25/0224; H04L 25/0238; H04L 5/0026; H04L 5/0044; H04L 5/0048; H04L 5/0051
See application file for complete search history.

(56) References Cited

U.S. PATENT DOCUMENTS 8,908,818 B2 * 12/2014 Wan .................. H04L 5/005
375/360
9,379,827 B2 * 6/2016 Sun .................. H04W 28/04
(Continued)

FOREIGN PATENT DOCUMENTS

CN     102122984 A     7/2011
CN     103684676 A     3/2013
(Continued)

OTHER PUBLICATIONS

International Search Report dated Nov. 8, 2016 for International Application No. PCT/CN2016/095726, 5 pages.
(Continued)

*Primary Examiner* — Rina C Pancholi
(74) *Attorney, Agent, or Firm* — Knobbe, Martens, Olson & Bear LLP

(57) ABSTRACT

Disclosed are a data processing method and apparatus. The method includes: a first receiving end determines a range of a data demodulation reference signal (DMRS) ports occupied by one or more second receiving ends by using at least one of the following information: a usage state of a joint encoding table corresponding to a DMRS port group, the number of layers corresponding to a physical downlink shared channel (PDSCH) of the first receiving end, and the number of codewords corresponding to the PDSCH of the first receiving end; and the first receiving end processes data according to the range of the DMRS ports occupied by one or more second receiving ends.

17 Claims, 2 Drawing Sheets

(51) Int. Cl.
H04L 5/00 (2006.01)
H04B 7/0452 (2017.01)

(52) U.S. Cl.
CPC ...... H04L 25/0224 (2013.01); H04L 25/0238 (2013.01); *H04L 5/0026* (2013.01); *H04L 5/0044* (2013.01); *H04L 5/0048* (2013.01)

(56) References Cited

U.S. PATENT DOCUMENTS

| | | | |
|---|---|---|---|
| 2011/0019776 A1* | 1/2011 | Zhang | H04L 5/0023 375/340 |
| 2013/0136199 A1* | 5/2013 | Wan | H04L 25/0204 375/260 |
| 2013/0265951 A1 | 10/2013 | Ng et al. | |
| 2014/0112287 A1* | 4/2014 | Chun | H04L 5/0023 370/329 |
| 2014/0112290 A1* | 4/2014 | Chun | H04L 5/00 370/329 |
| 2015/0208400 A1 | 7/2015 | Li et al. | |
| 2015/0236801 A1* | 8/2015 | Sun | H04B 7/024 370/328 |
| 2015/0263796 A1* | 9/2015 | Nam | H04B 7/0417 370/329 |
| 2016/0227520 A1* | 8/2016 | Davydov | H04L 5/00 |

FOREIGN PATENT DOCUMENTS

| | | |
|---|---|---|
| CN | 103841644 A | 6/2014 |
| EP | 2648448 A1 | 10/2013 |
| EP | 2882205 A1 | 6/2015 |
| WO | 2012177047 A2 | 12/2012 |

OTHER PUBLICATIONS

Written Opinion of the International Searching Authority dated Nov. 8, 2016 for International Application No. PCT/CN2016/095726, 3 pages.
ZTE, "DMRS layer-to-port mapping and power allocation", 3GPP TSG RAN WG1 Meeting #60BIS, R1-101831, Apr. 12, 2010.
Extended European Search Report of corresponding European Patent Application No. 16861371.9—8 pages (dated Jun. 6, 2019).

* cited by examiner

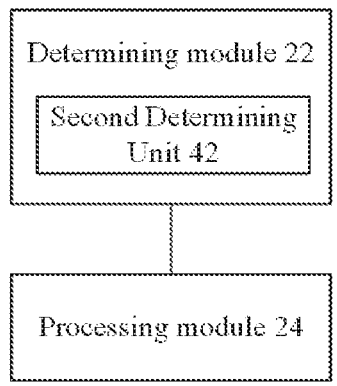
FIG. 4
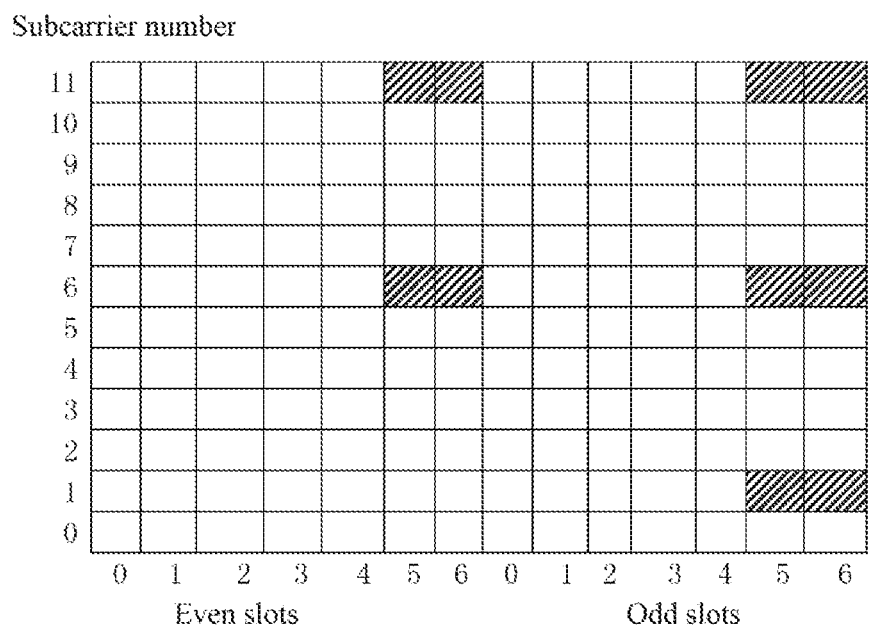
FIG. 5
| DMRS ports | Orthogonal code corresponding to DMRS ports $[\overline{w}_p(0) \ \overline{w}_p(1) \ \overline{w}_p(2) \ \overline{w}_p(3)]$ |
|---|---|
| 7(0000) | $[+1 \ +1 \ +1 \ +1]$ |
| 8(0101) | $[+1 \ -1 \ +1 \ -1]$ |
| 11(0011) | $[+1 \ +1 \ -1 \ -1]$ |
| 13(0110) | $[+1 \ -1 \ -1 \ +1]$ |
FIG. 6

10,784,938 B2

DATA PROCESSING METHOD AND APPARATUS

CROSS REFERENCE TO RELATED APPLICATIONS

This application is the U.S. National Phase Application under 35 U.S.C. § 371 of International Application No. PCT/CN2016/095726 filed on Aug. 17, 2016, designating the U.S. and published as WO 2017/076102 A1 on May 11, 2017, which claims the benefit of Chinese Patent Application No. 201510752412.5 filed on Nov. 6, 2015, which are hereby incorporated by reference in their entirety.

TECHNICAL FIELD

The present application relates to, but not limited to, the field of communications, and in particular, to a data processing method and apparatus.

BACKGROUND

With the development of technologies, a Multiple Input Multiple Output (MIMO) technology has become one of important means for improving spectrum utilization and providing high-speed data services in modern communication technologies. A 3rd Generation Partnership Project (3GPP) Rel-13 is researching increased antennas-based MIMO transmission technologies and corresponding data Demodulation Reference Signal (DMRS) enhancement schemes. With the increase of the number of the antennas, a transmitting end (for example, a base station, and the following description takes the base station as an example) can provide more numbers of narrower transmission beams. However, due to cost and other issues, the number of receiving antennas at a receiving end (for example, a terminal, and the following description takes the terminal as an example) does not be multiplied accordingly. At this time, a new base station also must be considered to serve for an old terminal. Thereby, in order to fully utilize a multiple antenna system throughput of the base station, it is needed to consider more users to participate in Multi-User Multiple-Input Multiple-Output (MU-MIMO).

At present, the 3GPP Radio Access Network (RAN1) 82b conference has decided to use DMRS ports with an orthogonal code of 4 for advanced MU-MIMO communication, that is, DMRS {7,8,11,13} ports of Long-Term Evolution (LTE) can be used to support high-order MU-MIMO transmission. At this time, the receiving end (which can be a terminal), after receiving its own port and layer number, cannot confirm port occupation situations of other receiving ends (eg, MU-MIMO user terminals). As a result, this will cause the problem of high complexity in blind detection of the Orthogonal Cover Code (OCC) length of the terminal, low channel estimation performance of the terminal, and low demodulation reception performance of the terminal.

In view of the problems in the prior art that the blind detection of the OCC length is complex, the channel estimation performance of the receiving end is low, and the demodulation reception performance of the receiving end is low due to the case that the receiving end cannot confirm the port occupation situations of other receiving ends, there is no effective solution proposed at present.

SUMMARY

The embodiments of the present disclosure provide a data processing method and apparatus.

In one aspect, a data processing method is provided, including the steps in which: a first receiving end determines a range of data demodulation reference signal (DMRS) ports occupied by one or more second receiving ends by using at least one of the following information: a usage state of a joint encoding table corresponding to a DMRS port group, the number of layers corresponding to a physical downlink shared channel (PDSCH) of the first receiving end, and the number of codewords corresponding to the PDSCH of the first receiving end; and the first receiving end processes data according to the range of the DMRS ports occupied by the one or more second receiving ends.

Alternatively, when the information used by the first receiving end includes the usage state of the joint encoding table, the number of the layers corresponding to the PDSCH of the first receiving end, and the number of the codewords corresponding to the PDSCH of the first receiving end, the first receiving end determines the range of the DMRS port group occupied by the one or more second receiving ends includes steps in which: the first receiving end determines, the range of the DMRS ports occupied by the one or more second receiving ends according to the DMRS port group occupied by the one or more second receiving ends. When a joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the one or more second receiving ends is a first DMRS port group or a second DMRS port group. When the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the one or more second receiving ends is the first DMRS port group or the second DMRS port group. When a joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the one or more second receiving ends is a third DMRS port group or a fourth DMRS port group. When the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the one or more second receiving ends is the third DMRS port group or the fourth DMRS port group. Other than the above cases, the DMRS port group occupied by the one or more second receiving ends is an empty set. The X11, the X12, the X21 and the X22 are all positive integers, the X11, the X12, the first DMRS port group and the second DMRS port group are all determined according to the joint encoding table 1, and the X21, the X22, the third DMRS port group and the fourth DMRS port group are all determined according to the joint encoding table 2. The joint encoding table 1 and the joint encoding table 2 are two different joint encoding tables, and the joint encoding table is a table including at least two of: the number of the layers corresponding to the PDSCH of the first receiving end, DMRS port occupied by the first receiving end, and a DMRS scrambling code identification $n_{scid}$ of the DMRS port occupied by the first receiving end, and a currently-used table is determined by the first receiving end according to first indication information from a transmitting end.

Alternatively, when the information used by the first receiving end includes the usage state of the joint encoding table, the first receiving end determines the range of the DMRS ports occupied by the one or more second receiving ends includes steps in which: the first receiving end determines the range of the DMRS ports occupied by the one or more second receiving ends according to the usage state of the joint encoding table and the DMRS port occupied by the first receiving end.

Alternatively, the first receiving end determines the range of the DMRS ports occupied by the one or more second receiving ends according to the usage state of the joint encoding table and the DMRS port occupied by the first receiving end includes steps in which: the first receiving end determines the range of the DMRS ports occupied by the one or more second receiving ends according to the DMRS port group occupied by the one or more second receiving ends. When the joint encoding table 1 is used by the first receiving end, and the DMRS port occupied by the first receiving end is a subset of a first DMRS port group or is a subset of a second DMRS port group, the DMRS port group occupied by the one or more second receiving ends is the first DMRS port group or the second DMRS port group. When the joint encoding table 2 is used by the first receiving end, and the DMRS port occupied by the first receiving end is a subset of a third DMRS port group or is a subset of a fourth DMRS port group, the DMRS port group occupied by the one or more second receiving ends is the third DMRS port group or the fourth DMRS port group. The first DMRS port group and the second DMRS port group are determined according to the joint encoding table 1, and the third DMRS port group and the fourth DMRS port group are determined according to the joint encoding table 2. The joint encoding table 1 and the joint encoding table 2 are two different joint encoding tables, and the joint encoding table is a table including at least two of: the number of the layers corresponding to the PDSCH of the first receiving end, the DMRS port occupied by the first receiving end, and a DMRS scrambling code identification of the DMRS port occupied by the first receiving end, and a currently-used table is determined by the first receiving end according to second indication information from a transmitting end.

Alternatively, when the DMRS port group occupied by the one or more second receiving ends is the first DMRS port group or the second DMRS port group, the DMRS port group occupied by the one or more second receiving ends is determined by the first receiving end according to third indication information from the transmitting end. When the DMRS port group occupied by the one or more second receiving ends is the third DMRS port group or the fourth DMRS port group, the DMRS port group occupied by the one or more second receiving ends is determined by the first receiving end according to fourth indication information from the transmitting end. Alternatively, the first DMRS port group and the second DMRS port group corresponding to the joint encoding table 1 are configured according to fifth indication information from the receiving end; and/or, the third DMRS port group and the fourth DMRS port group corresponding to the joint encoding table 2 are configured according to sixth indication information from the receiving end.

Alternatively, the first DMRS port group and the third DMRS port group are both {7,8}, and the second DMRS port group and the fourth DMRS port group are both {7,8,11,13}.

Alternatively, the first receiving end determines the range of the DMRS ports occupied by the one or more second receiving ends according to the DMRS port group occupied by the one or more second receiving ends, includes at least one of the following steps. In a step 1, all ports in the DMRS port group occupied by the one or more second receiving ends are determined as the range of the DMRS ports occupied by the one or more second receiving ends; initialization parameters of a scrambling sequence of the DMRS ports occupied by the one or more second receiving ends and initialization parameters of a scrambling sequence of the DMRS port occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{n_{scid,1}}$, and $n_{s,1}$ are respectively a scrambling code identification, a virtual cell identification and a subframe number corresponding to the DMRS port of the first receiving end; and $n_{scid,2}$, $n_{ID,1}^{n_{scid,2}}$ are $n_{s,2}$ are respectively a scrambling code identification, a virtual cell identification and a subframe number corresponding to the DMRS ports of the one or more second receiving ends. In a step 2, ports in the DMRS port group occupied by the one or more second receiving ends which are different from the DMRS port occupied by the first receiving end are determined as the range of the DMRS ports occupied by the one or more second receiving ends, the scrambling sequence of the DMRS ports occupied by the one or more second receiving ends and scrambling sequence of the DMRS port occupied by the first receiving end are the same, but orthogonal codes of the DMRS ports occupied by the one or more second receiving ends and orthogonal codes of the DMRS port occupied by the first receiving end are different.

In another aspect, a data processing apparatus is provided. The apparatus is applied to a first receiving end, including: a determining module, configured to determine a range of DMRS ports occupied by one or more second receiving ends by using at least one of the following information: a usage state of a joint encoding table corresponding to a DMRS port group, the number of layers corresponding to a PDSCH of the first receiving end, and the number of codewords corresponding to the PDSCH of the first receiving end; and a processing module, configured to process data according to the range of the DMRS ports occupied by the one or more second receiving ends.

Alternatively, when the information used by the first receiving end includes the usage state of the joint encoding table, the number of the layers corresponding to the PDSCH of the first receiving end, and the number of the codewords corresponding to the PDSCH of the first receiving end, the determining module includes: a first determining unit configured to determine the range of the DMRS ports occupied by the one or more second receiving ends according to the DMRS port group occupied by the one or more second receiving ends. When a joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the one or more second receiving ends is a first DMRS port group or a second DMRS port group. When the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the one or more second receiving ends is the first DMRS port group or the second DMRS port group. When a joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the one or more second receiving ends is a third DMRS port group or a fourth DMRS port group. When the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the one or more second receiving ends is the third DMRS port group or the fourth DMRS port group. Other than the above cases, the DMRS port group occupied by the one or more second receiving ends is an empty set. The X11, the X12, the X21, and the X22 are all positive integers; the X11, the X12, the first DMRS port group, and the second DMRS port group are all determined according to the joint encoding table 1, and the X21, the X22, the third DMRS port group, and the fourth DMRS port group are all determined according to the joint encoding table 2. The joint encoding table 1 and the joint encoding table 2 are two different joint encoding tables, and the joint encoding table is a table including at least two of: the number of the layers corresponding to the PDSCH of the first receiving end, DMRS port occupied by the first receiving end, and a DMRS scrambling code identification $n_{scid}$ of the DMRS port occupied by the first receiving end, and a currently-used table is determined by the first receiving end according to first indication information from a transmitting end.

Alternatively, when the information that used by the first receiving end includes the usage state of the joint encoding table, the determining module includes: a second determining unit, configured to determine the range of the DMRS ports occupied by the one or more second receiving ends according to the usage state of the joint encoding table and the DMRS port occupied by the first receiving end.

Alternatively, the second determining unit determines the range of the DMRS ports occupied by the one or more second receiving ends in the following manner: the first receiving end determines the range of the DMRS ports occupied by the one or more second receiving ends according to the DMRS port group occupied by the one or more second receiving ends. When the joint encoding table 1 is used by the first receiving end, and the DMRS port occupied by the first receiving end are a subset of a first DMRS port group or are a subset of a second DMRS port group, the DMRS port group occupied by the one or more second receiving ends is the first DMRS port group or the second DMRS port group. When the joint encoding table 2 is used by the first receiving end, and the DMRS port occupied by the first receiving end are a subset of a third DMRS port group or are a subset of a fourth DMRS port group, the DMRS port group occupied by the one or more second receiving ends is the third DMRS port group or the fourth DMRS port group. The first DMRS port group and the second DMRS port group are determined according to the joint encoding table 1, and the third DMRS port group and the fourth DMRS port group are determined according to the joint encoding table 2. The joint encoding table 1 and the joint encoding table 2 are two different joint encoding tables, and the joint encoding table is a table including at least two of: the number of the layers corresponding to the PDSCH of the first receiving end, the DMRS port occupied by the first receiving end, and a DMRS scrambling code identification $n_{scid}$ of the DMRS port occupied by the first receiving end, and a currently-used table is determined by the first receiving end according to second indication information from a transmitting end.

Alternatively, when the DMRS port group occupied by the one or more second receiving ends is the first DMRS port group or the second DMRS port group, the DMRS port group occupied by the one or more second receiving ends is determined by the first receiving end according to third indication information from the transmitting end. When the DMRS port group occupied by the one or more second receiving ends is the third DMRS port group or the fourth DMRS port group, the DMRS port group occupied by the one or more second receiving ends is determined by the first receiving end according to fourth indication information from the transmitting end.

Alternatively, the first DMRS port group and the second DMRS port group corresponding to the joint encoding table 1 are configured according to fifth indication information from the receiving end; and/or, the third DMRS port group and the fourth DMRS port group corresponding to the joint encoding table 2 are configured according to sixth indication information from the receiving end.

Alternatively, the first DMRS port group and the third DMRS port group are both {7,8}, and the second DMRS port group and the fourth DMRS port group are both {7,8,11,13}.

Alternatively, in the first determining unit and the second determining unit, the first receiving end determines the range of the DMRS ports occupied by the one or more second receiving ends according to the DMRS port group occupied by the one or more second receiving ends includes at least one of: all ports in the DMRS port group occupied by the one or more second receiving ends are determined as the range of the DMRS ports occupied by the one or more second receiving ends. Initialization parameters of a scrambling sequence of the DMRS ports occupied by the one or more second receiving ends and initialization parameters of a scrambling sequence of the DMRS port occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{n_{scid,1}}$, and $n_{s,1}$ are respectively a scrambling code identification, a virtual cell identification and a subframe number corresponding to the DMRS port of the first receiving end; and $n_{scid,2}$, $n_{ID,1}^{n_{scid,2}}$, and $n_{s,2}$ are respectively a scrambling code identification, a virtual cell identification and a subframe number corresponding to the DMRS ports of the one or more second receiving ends; and ports in the DMRS port group occupied by the one or more second receiving ends which are different from the DMRS port occupied by the first receiving end are determined as the range of the DMRS ports occupied by the one or more second receiving ends, the scrambling sequence of the DMRS ports occupied by the one or more second receiving ends and the scrambling sequence of the DMRS port occupied by the first receiving end are the same, but the orthogonal codes of the DMRS ports occupied by the one or more second receiving ends and the orthogonal codes of the DMRS port occupied by the first receiving end are different.

In another aspect, an embodiment of the present disclosure further provides a storage medium configured to store program code for performing the following steps: a range of DMRS ports occupied by one or more second receiving ends is determined according to at least one of the following information: a usage state of a joint encoding table corresponding to a DMRS port group, the number of layers corresponding to a PDSCH of the first receiving end, and the number of codewords corresponding to the PDSCH of the first receiving end; and data is processed according to the range of the DMRS ports occupied by the one or more second receiving ends.

Through the embodiment of the present disclosure, the first receiving end is used to determine the range of the DMRS ports occupied by the one or more second receiving ends by using at least one of the following information: the usage state of the joint encoding table corresponding to the DMRS port group, the number of layers corresponding to the PDSCH of the first receiving end, and the number of codewords corresponding to the PDSCH of the first receiving end; and the first receiving end processes data according to the range of the DMRS ports occupied by the one or more second receiving ends. Thereby, the problems in the prior art that blind detection of the OCC length is complex, channel estimation performance of the receiving end is low, and demodulation reception performance of the receiving end is low due to the case that the receiving end cannot confirm DMRS port occupation situations of other receiving ends can be solved. Therefore, the effects of reducing the complexity of the blind detection of the OCC length of the receiving end and improving the channel estimation performance of the receiving end and the demodulation reception performance of the receiving end can be achieved.

Other aspects can be understood after reading and understanding the drawings and detailed description.

BRIEF DESCRIPTION OF THE DRAWINGS

In the drawings:

FIG. 4 is a structural block diagram 2 of a determination module 22 in a data processing apparatus according to an embodiment of the present disclosure;

FIG. 5 is a schematic diagram of time-frequency resources occupied by DMRS {7,8,11,13} ports in a physical resource block according to an embodiment of the present disclosure; and FIG. 6 is an orthogonal code corresponding to the DMRS {7,8,11,13} ports.

DETAILED DESCRIPTION

Hereinafter, the present disclosure will be described in detail with reference to the accompanying drawings and in conjunction with the embodiments.

It should be noted that the terms "first", "second", and the like in the description and claims and the foregoing drawings of the present disclosure are used to distinguish similar objects and are not necessarily used to describe a particular order or sequence.

Figure 1:
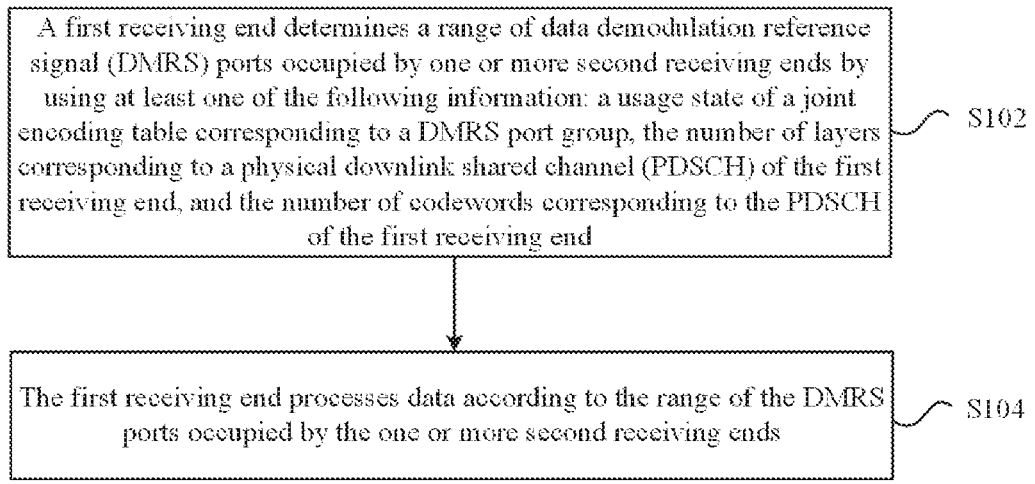
FIG. 1 is a flowchart of a data processing method according to an embodiment of the present disclosure.

In this embodiment, a data processing method is provided. FIG. 1 is a flowchart of the data processing method according to an embodiment of the present disclosure. As shown in FIG. 1, the process includes the following steps:

In step S102, a first receiving end determines a range of data demodulation reference signal (DMRS) ports occupied by one or more second receiving ends by using at least one of the following information: a usage state of a joint encoding table corresponding to a DMRS port group, the number of layers corresponding to a physical downlink shared channel (PDSCH) of the first receiving end, and the number of codewords corresponding to the PDSCH of the first receiving end.

In step S104, the first receiving end processes data according to the range of the DMRS ports occupied by the one or more second receiving ends.

Through the above steps, the first receiving end can determine the range of the DMRS ports occupied by other receiving ends, that is, the DMRS ports that may be occupied by other receiving ends can be determined. Thereby, it can solve the problems that the blind detection of the OCC length is complex, the channel estimation performance of the receiving end is low, and the demodulation reception performance of the receiving end is low due to the case that the receiving end cannot confirm the port occupation situations of other receiving ends. Therefore, the effects of reducing the complexity of the blind detection of the OCC length of the receiving end and improving the channel estimation performance of the receiving end and the demodulation reception performance of the receiving end are achieved.

The first receiving end can also determine the range of the DMRS ports occupied by the one or more second receiving ends according to the DMRS port of the first receiving end. The first receiving end and the second receiving ends both can be MU-MIMO users. The PDSCH of the first receiving end and the PDSCH of the second receiving ends can occupy the same time-frequency resources, and the DMRS of the first receiving end and the DMRS of the second receiving ends can occupy the same time-frequency resources. There can be many joint encoding tables. The corresponding relationship between different tables and the DMRS port group may be different, and the types of the tables may be diverse. Also, different tables can have their respective parameters.

In an embodiment, when the information used by the first receiving end includes the usage state of the joint encoding table, the number of the layers corresponding to the PDSCH of the first receiving end, and the number of the codewords corresponding to the PDSCH of the first receiving end, the first receiving end determines the range of the DMRS port group occupied by the one or more second receiving ends includes steps in which: the first receiving end determines the first receiving end, the range of the DMRS ports occupied by the one or more second receiving ends according to the DMRS port group occupied by the one or more second receiving ends. When a joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the one or more second receiving ends is a first DMRS port group or a second DMRS port group (or, in this case, the DMRS port group occupied by the one or more second receiving ends may be only the first DMRS port group). When the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the one or more second receiving ends is the first DMRS port group or the second DMRS port group (or, in this case, the DMRS port group occupied by the one or more second receiving ends may be only the first DMRS port group). When a joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the one or more second receiving ends is a third DMRS port group or a fourth DMRS port group. When the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the one or more second receiving ends is the third DMRS port group or the fourth DMRS port group. Other than the above cases, the DMRS port group occupied by the one or more second receiving ends is an empty set. The X11, the X12, the X21 and the X22 are all positive integers, the above X11, X12, the first DMRS port group and the second DMRS port group are all determined according to the joint encoding table 1, and the above X21, X22, the third DMRS port group and the fourth DMRS port group are all determined according to the joint encoding table 2. The joint encoding table 1 and the joint encoding table 2 are two different joint encoding tables, and the joint encoding table is a table including at least two of: the number of the layers corresponding to the PDSCH of the first receiving end, DMRS port occupied by the first receiving end, and a DMRS scrambling code identification $n_{scid}$ of the DMRS port occupied by the first receiving end, and a currently-used table is determined by the first receiving end according to first indication information from a transmitting end. The first DMRS port group and the third DMRS port group can be configured independently (can be configured by the transmitting end), both can be the same or different. Similarly, the second DMRS port group and the fourth DMRS port group can also be configured independently, and the two can be the same or different.

Optionally, the first indication information can be Radio Resource Control (RRC) signaling, and it may also be other types of indication information as necessary. In the above embodiment, when the DMRS port group occupied by the second receiving end is an empty set, the first receiving end can assume that it is in a SU-MIMO transmission mode at this time or other MU-MIMO users (i.e, one or more second receiving ends) do not occupy the DMRS ports other than the DMRS port of the first receiving end at this time. When a set of the DMRS port groups occupied by the second receiving end includes multiple DMRS port groups, the first receiving end can assume that other MU-MIMO users (i.e, one or more second receiving ends) occupy some or all of the DMRS ports in one of the DMRS port groups in the set at this time.

In an embodiment, when the information used by the first receiving end includes the usage state of the joint encoding table, the first receiving end determines the range of the DMRS ports occupied by the one or more second receiving ends includes a step in which: the first receiving end determines the range of the DMRS ports occupied by the one or more second receiving ends according to the usage state of the joint encoding table and the DMRS port occupied by the first receiving end.

In an embodiment, the first receiving end determines the range of the DMRS ports occupied by the one or more second receiving ends according to the usage state of the joint encoding table and the DMRS port occupied by the first receiving end includes a step in which: the first receiving end determines the range of the DMRS ports occupied by the one or more second receiving ends according to the DMRS port group occupied by the one or more second receiving ends. When the joint encoding table 1 is used by the first receiving end, and the DMRS port occupied by the first receiving end is a subset of a first DMRS port group or is a subset of a second DMRS port group, the DMRS port group occupied by the one or more second receiving ends is the first DMRS port group or the second DMRS port group. When the joint encoding table 2 is used by the first receiving end, and the DMRS port occupied by the first receiving end is a subset of a third DMRS port group or is a subset of a fourth DMRS port group, the DMRS port group occupied by the one or more second receiving ends is the third DMRS port group or the fourth DMRS port group. The first DMRS port group and the second DMRS port group are determined according to the joint encoding table 1, and the third DMRS port group and the fourth DMRS port group are determined according to the joint encoding table 2. The joint encoding table 1 and the joint encoding table 2 are two different joint encoding tables, and the joint encoding table is a table including at least two of: the number of the layers corresponding to the PDSCH of the first receiving end, the DMRS port occupied by the first receiving end, and a DMRS scrambling code identification of the DMRS port occupied by the first receiving end, and a currently-used table is determined by the first receiving end according to second indication information from a transmitting end.

In an embodiment, when the DMRS port group occupied by the one or more second receiving ends is the first DMRS port group or the second DMRS port group, the DMRS port group occupied by the one or more second receiving ends is determined by the first receiving end according to third indication information from the transmitting end (that is, the first receiving end determines, according to the third indication information from the transmitting end, which of the first DMRS port group and the second DMRS port group is the DMRS port group occupied by the one or more second receiving ends). When the DMRS port group occupied by the one or more second receiving ends is the third DMRS port group or the fourth DMRS port group, the DMRS port group occupied by the one or more second receiving ends is determined by the first receiving end according to fourth indication information from the transmitting end (that is, the first receiving end determines, according to the fourth indication information from the transmitting end, which of the third DMRS port group and the fourth DMRS port group is the DMRS port group occupied by the one or more second receiving ends). The third indication information and/or the fourth indication information can be dynamic indication information and/or semi-static indication information.

In an embodiment, the first DMRS port group and the second DMRS port group corresponding to the joint encoding table 1 are configured according to fifth indication information from the receiving end; and/or, the third DMRS port group and the fourth DMRS port group corresponding to the joint encoding table 2 are configured according to sixth indication information from the receiving end.

In an embodiment, the first DMRS port group and the third DMRS port group are both {7,8}, and the second DMRS port group and the fourth DMRS port group are both {7,8,11,13}.

In an embodiment, the first receiving end determines the range of the DMRS ports occupied by the one or more second receiving ends according to the DMRS port group occupied by the one or more second receiving ends, includes at least one of the following steps. In a step 1, all ports in the DMRS port group occupied by the one or more second receiving ends are determined as the range of the DMRS ports occupied by the one or more second receiving ends, and initialization parameters of a scrambling sequence of the DMRS ports occupied by the one or more second receiving ends and initialization parameters of a scrambling sequence of the DMRS port occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{n_{scid,1}}$, and $n_{s,1}$ are respectively a scrambling code identification, a virtual cell identification and a subframe number corresponding to the DMRS port of the first receiving end; and $n_{scod,2}$, $n_{ID,1}^{n_{scid,2}}$, and $n_{s,2}$ are respectively a scrambling code identification, a virtual cell identification and a subframe number corresponding to the DMRS ports of the one or more second receiving ends. In a step 2, ports in the DMRS port group occupied by the one or more second receiving ends which are different from the DMRS port occupied by the first receiving end are determined as the range of the DMRS ports occupied by the one or more second receiving ends, the scrambling sequence of the DMRS ports occupied by the one or more second receiving ends and the scrambling sequence of the DMRS port occupied by the first receiving end are the same, but the orthogonal codes of the DMRS ports occupied by the one or more second receiving ends and the orthogonal codes of the DMRS port occupied by the first receiving end are different.

It should be noted that the above-mentioned various indication information (including the first indication information, the second indication information, the third indication information, the fourth indication information, the fifth indication information, and the sixth indication information) can be semi-static Radio Resource Control (RRC) signaling, and it can also be other types of indication information as necessary, such as dynamic indication information.

Through the description of the above implementation, those skilled in the art can clearly understand that the method according to the above embodiments can be implemented by means of software and a general hardware platform if necessary, and also, the hardware may be used, but in many cases, the former is a better implementation. Based on such understanding, the technical solution of the present application essentially or the part that contributes to the related art can be embodied in the form of a software product. The computer software product is stored in a storage medium (such as a ROM/RAM, a magnetic disk, an optical disk) and includes instructions for causing an apparatus (which may be a mobile phone, a computer, a server, or a network device, etc.) at a receiving end to execute the method described in each embodiment of the present application.

In this embodiment, a data processing apparatus is further provided. The apparatus is used to implement the foregoing embodiment and preferred implementation, which have been described and will not be described again. As used below, the term "module" can implement a combination of software and/or hardware of a predetermined function. Although the apparatus described in the following embodiment is preferably implemented in software, implementation of hardware or a combination of software and hardware is also possible and conceived.

Figure 2:
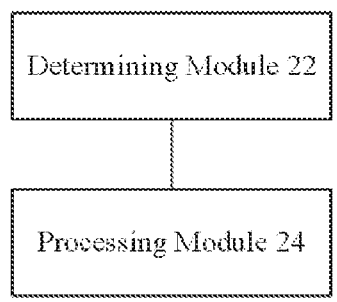
FIG. 2 is a structural block diagram of a data processing apparatus according to an embodiment of the present disclosure.

FIG. 2 is a structural block diagram of the data processing apparatus according to an embodiment of the present disclosure. The apparatus may be applied to the first receiving end. As shown in FIG. 2, the apparatus includes a determining module 22 and a processing module 24. The data processing apparatus will be described below.

The determining module 22 is configured to determine the range of the DMRS ports occupied by the one or more second receiving ends by using at least one of the following information: the usage status of the joint encoding table corresponding to the DMRS port group, the number of layers corresponding to the PDSCH of the first receiving end, the number of codewords corresponding to the PDSCH of the first receiving end, and the processing module 24 is connected to the determining module 22 and configured to process data according to the range of the DMRS ports occupied by the one or more second receiving ends.

Figure 3:
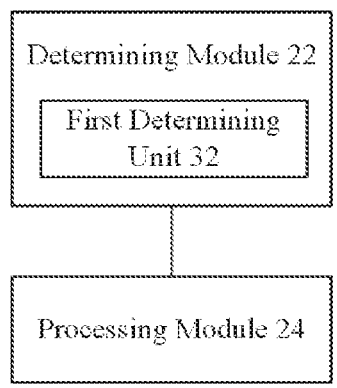
FIG. 3 is a structural block diagram 1 of a determination module 22 in a data processing apparatus according to an embodiment of the present disclosure.

FIG. 3 is a structural block diagram 1 of the determination module 22 in the data processing apparatus according to an embodiment of the present disclosure. When the information used by the first receiving end includes the usage state of the joint encoding table, the number of the layers corresponding to the PDSCH of the first receiving end, and the number of the codewords corresponding to the PDSCH of the first receiving end, the determining module may include the first determining unit 32. The first determining unit 32 is described below.

The first determining unit 32 is configured to determine the range of the DMRS ports occupied by the one or more second receiving ends by using the DMRS port group occupied by the one or more second receiving ends. When the joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the one or more second receiving ends is the first DMRS port group or the second DMRS port group. When the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the one or more second receiving ends is the first DMRS port group or the second DMRS port group. When the joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the one or more second receiving ends is first third DMRS port group or first fourth DMRS port group. When the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the one or more second receiving ends is the third DMRS port group or the fourth DMRS port group. Other than the above cases, the DMRS port group occupied by the one or more second receiving ends is an empty set. The X11, the X12, the X21 and the X22 are all positive integers, the X11, the X12, the first DMRS port group and the second DMRS port group are all determined according to the joint encoding table 1, and the X21, the X22, the third DMRS port group and the fourth DMRS port group are all determined according to the joint encoding table 2. The joint encoding table 1 and the joint encoding table 2 are two different joint encoding tables. The joint encoding table is a table including at least two of: the number of the layers corresponding to the PDSCH of the first receiving end, DMRS ports occupied by the first receiving end, and a DMRS scrambling code identification $n_{setd}$ of the DMRS ports occupied by the first receiving end. A currently-used table is determined by the first receiving end according to first indication information from a transmitting end.

FIG. 4 is a structural block diagram 2 of the determining module 22 in the data processing apparatus according to an embodiment of the present disclosure. When the information used by the first receiving end includes the usage state of the joint encoding table, the determining module 22 includes a second determining unit 42. The second determining unit 42 is described below.

The second determining unit 42 is configured to determine the range of the DMRS ports occupied by the one or more second receiving ends according to the usage state of the joint encoding table and the DMRS ports occupied by the first receiving end.

In an embodiment, the second determining unit 42 can determine the range of the DMRS ports occupied by the one or more second receiving ends in the following manner: the range of the DMRS ports occupied by the one or more second receiving ends is determined according to the DMRS port group occupied by the one or more second receiving ends. When the joint encoding table 1 is used by the first receiving end, and the DMRS ports occupied by the first receiving end is the subset of the first DMRS port group or the subset of the second DMRS port group, the DMRS port group occupied by the one or more second receiving ends is the first DMRS port group or the second DMRS port group. When the joint encoding table 2 is used by the first receiving end, and the DMRS ports occupied by the first receiving end is the subset of the third DMRS port group and the subset of the fourth DMRS port group, the DMRS port group occupied by the one or more second receiving ends is the third DMRS port group or the fourth DMRS port group. The first DMRS port group and the second DMRS port group are determined according to the joint encoding table 1. The third DMRS port group and the fourth DMRS port group are determined according to the joint encoding table 2. The joint encoding table 1 and the joint encoding table 2 are two different joint encoding tables. The joint encoding table is a table including at least two of: the number of the layers corresponding to the PDSCH of the first receiving end, the DMRS ports occupied by the first receiving end, and a DMRS scrambling code identification of the DMRS ports occupied by the first receiving end. A currently-used table is determined by the first receiving end according to second indication information from a transmitting end.

In an embodiment, when the DMRS port group occupied by the one or more second receiving ends is the first DMRS port group or the second DMRS port group, the DMRS port group occupied by the one or more second receiving ends is determined by the first receiving end according to third indication information from the transmitting end. When the DMRS port group occupied by the one or more second receiving ends is the third DMRS port group or the fourth DMRS port group, the DMRS port group occupied by the one or more second receiving ends is determined by the first receiving end according to fourth indication information from the transmitting end.

In an embodiment, the first DMRS port group and the second DMRS port group corresponding to the joint encoding table 1 are configured according to fifth indication information from the receiving end; and/or, the third DMRS port group and the fourth DMRS port group corresponding to the joint encoding table 2 are configured according to sixth indication information from the receiving end.

In an embodiment, the first DMRS port group and the third DMRS port group are both {7,8}, and the second DMRS port group and the fourth DMRS port group are both {7,8,11,13}.

In an embodiment, in the first determining unit 32 and the second determining unit 42, the first receiving end determines the range of the DMRS ports occupied by the one or more second receiving ends according to the DMRS port group occupied by the one or more second receiving ends, includes at least one of the following steps: in a step 1, all ports in the DMRS port group occupied by the one or more second receiving ends are determined as the range of the DMRS ports occupied by the one or more second receiving ends; initialization parameters of a scrambling sequence of the DMRS ports occupied by the one or more second receiving ends and initialization parameters of a scrambling sequence of the DMRS ports occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{v_{scid,1}}$, and $n_{s,1}$ are respectively a scrambling code identification, a virtual cell identification and a subframe number corresponding to the DMRS port of the first receiving end; and $n_{scid,2}$, $n_{ID,1}^{n_{scid,2}}$, and $n_{s,2}$ are respectively a scrambling code identification, a virtual cell identification and a subframe number corresponding to the DMRS ports of the one or more second receiving ends; and in a step 2, ports in the DMRS port group occupied by the one or more second receiving ends which are different from the DMRS ports occupied by the first receiving end are determined as the range of the DMRS ports occupied by the one or more second receiving ends, and the scrambling sequence of the DMRS ports occupied by the one or more second receiving ends and the scrambling sequence of the DMRS ports occupied by the first receiving end are the same, but the orthogonal codes of the DMRS ports occupied by the one or more second receiving ends and the orthogonal codes of the DMRS ports occupied by the first receiving end are different.

The present disclosure will be described below with reference to specific embodiments.

FIG. 5 is a schematic diagram of time-frequency resources occupied by DMRS {7,8,11,13} ports in a physical resource block according to an embodiment of the present disclosure. Four DMRS ports occupy the same time-frequency resources by code division multiplexing. As shown in FIG. 5, the DMRS port {7,8,11,13} occupies last two OFDM symbols of two slots in one subframe in time domain, and occupies subcarriers with sequence number {11, 6, 1} in the Physical Resource Block (PRB) in frequency domain. The code division multiplexing is performed by the DMRS ports {7,8,11,13} on the four REs on the same subcarrier. FIG. 6 is orthogonal codes corresponding to the DMRS {7,8,11,13} ports.

Embodiment 1

In this embodiment, the receiving end (corresponding to the first receiving end) obtains information on the range of the DMRS ports occupied by other MU-MIMO users (corresponding to the one or more second receiving ends) according to: enabling state of the joint encoding table, the number of layers corresponding to the PDSCH of the receiving end, the number of the codewords corresponding to the PDSCH of the receiving end and the DMRS ports of the receiving end.

In this embodiment, the joint encoding table 1 corresponds to, in a LTE Rel2 version, a joint encoding table including the number of layers of the corresponding old 3 bits of the receiving ends, the DMRS ports of the receiving ends, and the scrambling code identification of the DMRS of the receiving ends in a Downlink control information format 2C (DCI2C) and a Downlink control information format 2D (DCI2D), as shown in Table 1. The joint encoding table 2 corresponds to a joint encoding table including another number of layers, the DMRS ports, and the scrambling code identification $n_{setd}$ of the DMRS newly added in DCI2C, DCI2D, and other Downlink Control Information format (DCI) in a Rel-13 version, and an implementation of the joint encoding table 2 is shown in Table 2. The specific encoding mode of the joint encoding table 2 is only an example, but does not exclude other specific joint encoding modes.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 | 0 | 2 layers, ports 7-8, nSCID = 0 |
| 1 | 1 layer, port 7, nSCID = 1 | 1 | 2 layers, ports 7-8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 | 0 | 2 layers, ports 7~8, nSCID = 0 |
| 1 | 1 layer, port 7, nSCID = 1 | 1 | 2 layers, ports7~8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 1 layer, port 11, nSCID = 0 | 6 | 2 layers, ports {11, 13}, nSCID = 0 |
| 7 | 1 layer, port 13, nSCID = 0 | 7 | 2 layers, ports{11, 13}, nSCID = 1 |

In this embodiment, the joint encoding table 1 corresponds to the first DMRS port group, and the joint encoding table 2 corresponds to the third joint encoding table and the fourth joint encoding table. The correspondence relationship may be shown in Table 3, which is pre-determined by the transmitting end and the receiving end. In another implementation of this embodiment, the first DMRS port group can be configured for the joint encoding table 1 through RRC signaling, and the third DMRS port group and the fourth DMRS port group can be independently configured for the joint encoding table 2.

TABLE 3

| Joint encoding table | Corresponding DMRS port group |
|---|---|
| Joint encoding table 1 | {7, 8} |
| Joint encoding table 2 | {7, 8}, {7, 8, 11, 13} |

The determination on the range of the DMRS ports occupied by other MU-MIMO users (corresponding to one or more second receiving ends) is described below in combination with specific steps.

Step 1: The first receiving end obtains the DMRS port group occupied by the one or more second receiving ends according to the currently-used joint encoding table, the number of layers corresponding to the PDSCH of the first receiving end, and the number of the codewords corresponding to the first receiving end.

Optionally, when the joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the one or more second receiving ends is the first DMRS port group. In this embodiment, the DMRS port group corresponding to the joint encoding table 1 described with reference to the Table 3 is a {7,8} port group.

When the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the one or more second receiving ends is the first DMRS port group. In this embodiment, the DMRS port group corresponding to the joint encoding table 1 described with reference to the Table 3 is the {7,8} port group.

When the joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the one or more second receiving ends is the third DMRS port group or the fourth DMRS port group. In this embodiment, the third DMRS port group corresponding to the joint encoding table 2 described with reference to the Table 3 is the {7,8} port group, and the fourth DMRS port group corresponding to the joint encoding table 2 is a {7,8,11,13} port group.

When the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the one or more second receiving ends is the third DMRS port group or the fourth DMRS port group. In this embodiment, the third DMRS port group corresponding to the joint encoding table 2 described with reference to the Table 3 is the {7,8} port group, and the fourth DMRS port group corresponding to the joint encoding table 2 is the {7,8,11,13} port group.

Other than the above cases, the DMRS port group occupied by the one or more second receiving ends is an empty set.

X11 is the maximum number of layers which are possibly in an MU transmission mode in single codeword transmission in the joint encoding table 1, X12 is the maximum number of layers which are possibly in the MU transmission mode in dual codewords transmission in the joint encoding table 1, X21 is the maximum number of layers which are possibly in the MU transmission mode in the single codeword transmission in the joint encoding table 2, and X22 is the maximum number of layers which are possibly in the MU transmission mode in the dual codewords transmission in the joint encoding table 2. In this embodiment, X11=X21=1, and X12=X22=2.

For example, when the joint encoding table 2 is enabled (that is, the transmitting end indicates the first receiving end, and then according to the Table 2 and a value of a joint encoding domain, the number of layers of the PDSCH of the first receiving end, the DMRS ports of the first receiving end, and the scrambling code identification ID ($n_{scid}$) of the DMRS ports of the first receiving end can be obtained), the number of the codewords of the first receiving end is 2, the joint encoding value is 0, the number of the layers is 2, and the DMRS ports of the first receiving end is {7,8}, so that the DMRS port group occupied by the one or more second receiving end is {7,8} or {7,8,11,13}.

Step 2: The first receiving end determines the range of the DMRS port group occupied by the one or more second receiving ends according to the DMRS port group occupied by the one or more second receiving ends.

Optionally, the range of the DMRS ports occupied by the one or more second receiving ends includes one or two of the following cases.

In the first case, all ports in the DMRS port group are occupied (that is, all ports in the DMRS port group occupied by the one or more second receiving ends may be all ports of the first DMRS port group, and may also be all ports of other DMRS port groups); and in this case, initialization parameters of a scrambling sequence of the DMRS ports occupied by the one or more second receiving ends and initialization parameters of a scrambling sequence of the DMRS ports occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{v_{scid,1}}$, and $n_{s,1}$ are respectively a scrambling code identification ID, a virtual cell identification ID and a subframe number corresponding to the DMRS ports of the first receiving end; and $n_{scid,2}$, $n_{ID,1}^{n_{scid,2}}$, and $n_{s,2}$ are respectively a scrambling code identification ID, a virtual cell identification ID and a subframe number corresponding to the DMRS ports of the one or more second receiving ends.

In the second case, the ports in the DMRS port group which are different from the DMRS ports of the first receiving end are occupied, and in this case, the scrambling sequence of the ports occupied by the one or more second receiving ends and the scrambling sequence of the DMRS ports occupied by the first receiving end are the same, but the orthogonal codes of the ports occupied by the one or more second receiving ends and the orthogonal codes of the DMRS ports occupied by the first receiving end are different.

For example, as described in step 1 above, the DMRS ports of the first receiving end are {7,8}, then the DMRS port group occupied by the one or more second receiving ends is {7,8} or {7,8,11,13}. In this way, the range of the DMRS ports occupied by the one or second receiving ends includes one or two of the following cases.

In the first case, the DMRS ports {7,8} or {7,8,11,13} are occupied by the one or more second receiving ends, and the corresponding scrambling sequence of these ports is differ-ent from the scrambling sequence of the ports {7,8} of the first receiving end, and the initialization parameters of the scrambling sequence meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. An initialization function of the DMRS in the existing LTE 211 protocol is: $c_{init}=(\lfloor n_s/2 \rfloor+1)\cdot(2n_{ID}^{(n_{SCID})}+1)\cdot 2^{16}+n_{SCID}$. If the corresponding parameters of the DMRS ports of the first receiving end are ($n_{scid,1}$, $n_{ID,1}^{n_{scid,1}}$, $n_{s,1}$) in this case, then the corresponding parameters of the one or more second DMRS ports meet ($n_{scid,2}$, $n_{ID,1}^{n_{scid,2}}$, $n_{s,2}$)=($1-n_{scid,1}$, $n_{ID,1}^{n_{scid,1}}$, $n_{s,1}$). In this case, the DMRS port group {7,8} is abbreviated as a pseudo-orthogonal DMRS port group 1, and the DMRS port group {7,8,11,13} is abbreviated as a pseudo-orthogonal DMRS port group 2.

In the second case, the port { } or {11, 13} is occupied by the one or more second receiving ends. In this case, the scrambling sequence of the ports occupied by the one or more second receiving ends and the scrambling sequence of the DMRS ports of the first receiving end are the same, but the orthogonal codes of the ports occupied by the one or more second receiving ends and the orthogonal codes of the DMRS ports of the first receiving end are different. Hereinafter, the { } is abbreviated as the orthogonal DMRS port group 1, and the {11, 13} is abbreviated as the orthogonal DMRS port group 2.

In an implementation of this embodiment, the range of the DMRS ports occupied by the one or more second receiving ends includes two DMRS port groups, that is, one of the pseudo-orthogonal DMRS port group 1 or the pseudo-orthogonal DMRS port group 2, and one of the orthogonal DMRS port group 1 or the orthogonal DMRS port group 2.

Step 3: The first receiving end needs to assume that one or more second receiving ends may occupy part or all of the DMRS ports in one of the pseudo-orthogonal DMRS port group 1 and the pseudo-orthogonal DMRS port group 2. The first receiving end needs to further assume that there may be one or more second receiving ends occupying some or all of the DMRS ports in one of the orthogonal DMRS port group 1 and the orthogonal DMRS port group 2. Apparently, as described in the above embodiment, when it is the table 1, there are only the pseudo-orthogonal group 1 and the orthogonal group 1. In this case, the first receiving end needs to assume that the one or more second receiving ends may occupy some or all of the DMRS ports in the pseudo-orthogonal DMRS port group 1, and the first receiving end needs to further assume that the one or more second receiving ends may occupy some or all of the DMRS ports in the orthogonal DMRS port group 1.

In an alternative embodiment, the Table 3 may be replaced with Table 4. In this case, the first DMRS port group corresponding to the joint encoding table 1 is {7,8} and the second DMRS port group corresponding to the joint encoding table 1 is {7,8,11,13}, and the third DMRS port group corresponding to the joint encoding table 2 is {7,8}, and the fourth DMRS port group corresponding to the joint encoding table 2 is {7,8,11,13}. The table 4 is pre-determined by the transmitting end and the receiving end. In another implementation of this embodiment, the first DMRS port group and second DMRS port group can be configured for the joint encoding table 1 through RRC signaling (corresponding to the fifth indication information and sixth indication information), respectively, and the third DMRS port group and the fourth DMRS port group can be configured independently for the joint encoding table 2. The first to fourth DMRS port groups may be the DMRS port groups different from {7,8} and {7,8,11,13}.

TABLE 4

| Joint encoding table | Corresponding DMRS port group |
|---|---|
| Joint encoding table 1 | {7, 8}, {7, 8, 11, 13} |
| Joint encoding table 2 | {7, 8}, {7, 8, 11, 13} |

In an alternative embodiment, the Table 3 may be replaced with Table 5. In this case, the first DMRS port group corresponding to the joint encoding table 1 is {7,8}, and the fourth DMRS port group corresponding to the joint encoding table 2 is {7,8}. The table 4 is pre-determined by the transmitting end and the receiving end. In another implementation of this embodiment, the first DMRS port group can be configured for the joint encoding table 1 through RRC signaling (the fifth indication information and sixth indication information), respectively, and the third DMRS port group can be configured independently for the joint encoding table 2. The first DMRS port group and the third DMRS port group may be the DMRS port groups different from {7,8} and {7,8,11,13}.

TABLE 5

| Joint encoding table | Corresponding DMRS port group |
|---|---|
| Joint encoding table 1 | {7, 8} |
| Joint encoding table 2 | {7, 8, 11, 13} |

Alternatively, in this embodiment, when the DMRS port group occupied by the one or more second receiving ends is the first DMRS port group or the second DMRS port group, the first receiving end determines the DMRS port group occupied by the one or more second receiving ends according to the third indication information from the transmitting end, and the DMRS port group is one of the first DMRS port group and the second DMRS port group.

When the DMRS port group occupied by the one or more second receiving ends is the third DMRS port group or the fourth DMRS port group, the first receiving end determines the DMRS port group occupied by the one or more second receiving ends according to the fourth indication information from the transmitting end, and the DMRS port group is one of the third DMRS port group and the fourth DMRS port group.

Embodiment 2

In this embodiment, the first receiving end determines the range of the DMRS ports occupied by the one or more second receiving ends according to the usage state of the joint encoding table and the DMRS ports occupied by the first receiving end includes the following steps.

The first receiving end determines the range of the DMRS ports occupied by the one or more second receiving ends according to the DMRS port group occupied by the one or more second receiving ends Step 1: The first receiving end obtains the DMRS port group occupied by the one or more second receiving ends according to the currently-used joint encoding table and the DMRS ports occupied by the first receiving end.

When the joint encoding table 1 is used by the first receiving end, and the DMRS ports occupied by the first receiving end are a subset of {7,8} of the first DMRS port group, the DMRS port group occupied by the one or more second receiving ends is the first DMRS port group {7,8}.

When the joint encoding table 2 is used by the first receiving end, and the DMRS ports occupied by the first receiving end are a subset of the third DMRS port group {7,8} or are a subset of the fourth DMRS port group {7,8,11,13}, the DMRS port group occupied by one or more second receiving ends is the third DMRS port group or the fourth DMRS port group.

In this embodiment, the first DMRS port group and the third DMRS port group may be fixed to {7,8}, and the fourth DMRS port group may be fixed to {7,8,11,13}.

In this embodiment, when the DMRS port group occupied by one or more second receiving ends is the first DMRS port group or the second DMRS port group, the first receiving end does not know the DMRS port group is which one of the two DMRS port groups, but only knows the DMRS port group is one of the two DMRS port groups. In this case, the first receiving end may determine, according to the third indication information from the transmitting end, that the DMRS port group occupied by the one or more second receiving ends is which one of the first DMRS port group and the second DMRS port group.

When the DMRS port group occupied by the one or more second receiving ends is the third DMRS port group or the fourth DMRS port group, the first receiving end does not know the DMRS port group is which one of the two DMRS port group, but only knows the DMRS port group is one of the two DMRS port groups. In this case, the first receiving end may determine, according to the fourth indication information from the transmitting end, that the DMRS port group occupied by the one or more second receiving ends is which one of the third DMRS port group and the fourth DMRS port group.

Step 2: The first receiving end determines the range of the DMRS ports occupied by the one or more second receiving ends according to the DMRS port group occupied by the one or more second receiving ends.

Specifically, the range of the DMRS ports occupied by the one or more second receiving ends includes one or two of the following cases.

In the first case, all ports in the DMRS port group are occupied (that is, all ports in the DMRS port group are occupied by the determined one or more second receiving ends), and in this case, initialization parameters of a scrambling sequence of the DMRS ports occupied by the one or more second receiving ends and initialization parameters of a scrambling sequence of the DMRS ports occupied by the first receiving end meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. $n_{scid,1}$, $n_{ID,1}^{v_{scid,1}}$, and $n_{s,1}$ are respectively a scrambling code identification ID, a virtual cell identification ID and a subframe number corresponding to the DMRS ports of the first receiving end; and $n_{scid,2}$, $n_{ID,1}^{n_{scid,2}}$, and $n_{s,2}$ are respectively a scrambling code identification ID, a virtual cell identification ID and a subframe number corresponding to the DMRS ports of the one or more second receiving ends.

In the second case, the ports in the DMRS port group which are different from the DMRS ports of the first receiving end are occupied, and in this case, the scrambling sequence of the ports occupied by the one or more second receiving ends and the scrambling sequence of the DMRS ports occupied by the first receiving end are the same, but the orthogonal codes of the ports occupied by the one or more second receiving ends and the orthogonal codes of the DMRS ports occupied by the first receiving end are different.

For example, the DMRS ports of the first receiving end are {7,8}, and the DMRS port group occupied by one or more second receiving end is {7,8} or {7,8,11,13}. In this way, the range of the DMRS ports occupied by the one or the second receiving ends includes one or two of the following cases.

In the first case, the DMRS ports {7,8} or {7,8,11,13} are occupied by the one or more second receiving ends, and the corresponding scrambling sequence of these ports is different from the scrambling sequence of the port {7,8} of the first receiving end, and the initialization parameters of the scrambling sequence meet the following conditions: $n_{scid,2}=1-n_{scid,1}$, $n_{ID,1}^{n_{scid,1}}=n_{ID,2}^{n_{scid,2}}$, $n_{s,1}=n_{s,2}$. An initialization function of the DMRS in the existing LTE 211 protocol is: $c_{init}=(\lfloor n_s/2 \rfloor +1)\cdot(2n_{ID}^{(nSCID)}+1)\cdot 2^{16}+n_{SCID}$. If the corresponding parameters of the DMRS ports of the first receiving end are $(n_{scid,1}, n_{ID,1}^{n_{scid,2}}, n_{s,1})$ in this case, then the corresponding parameters of the one or more second DMRS ports meet $(n_{scid,2}, n_{ID,1}^{n_{scid,2}}, n_{s,2})=(1-n_{scid,1}, n_{ID,1}^{n_{scid,1}}, n_{s,1})$. In this case, the DMRS port group {7,8} is abbreviated as a pseudo-orthogonal DMRS port group 1, and the DMRS port group {7,8,11,13} is abbreviated as a pseudo-orthogonal DMRS port group 2.

In the second case, the port group occupied by the one or more second receiving ends is 1 or {11, 13}. In this case, the scrambling sequence of the ports occupied by the one or more second receiving ends and the scrambling sequence of the DMRS ports of the first receiving end are the same, but the orthogonal codes of the ports occupied by the one or more second receiving ends and the orthogonal codes of the DMRS ports of the first receiving end are different. Hereafter, the 1 is abbreviated as the orthogonal DMRS port group 1, and the {11, 13} is abbreviated as the orthogonal DMRS port group 2.

In an implementation of this embodiment, the range of the DMRS ports occupied by the one or more second receiving ends includes two DMRS port groups, that is, one of the pseudo-orthogonal DMRS port group 1 or the pseudo-orthogonal DMRS port group 2 and one of the orthogonal DMRS port group 1 or the orthogonal DMRS port group 2.

Step 3: The first receiving end needs to assume that one or more second receiving ends may occupy part or all of the DMRS ports in one of the pseudo-orthogonal DMRS port group 1 and the pseudo-orthogonal DMRS port group 2. The first receiving end needs to further assume that there may be one or more second receiving ends occupying some or all of the DMRS ports in one of the orthogonal DMRS port group 1 and orthogonal DMRS port group 2. Apparently, as described in the above embodiment, in the table 1, there are only the pseudo-orthogonal group 1 and the orthogonal group 1. In this case, the first receiving end needs to assume that the one or more second receiving ends may occupy some or all of the DMRS ports in the pseudo-orthogonal DMRS port group 1, and the first receiving end needs to further assume that the one or more second receiving ends may occupy some or all of the DMRS ports in the orthogonal DMRS port group 1.

It should be noted that the above modules can be implemented by software or hardware, and the latter can be implemented in the following manner that the above modules are all located in the same processor, or the above modules are respectively located in multiple processors, but the present disclosure is not limited to thereto.

The embodiments of the present disclosure also provide a storage medium. Optionally, in the present embodiment, the storage medium can be set to store program code for executing the following steps.

S1, the first receiving end determines a range of data demodulation reference signal DMRS ports occupied by one or more second receiving ends by using at least one of the following information: a usage state of a joint encoding table corresponding to a DMRS port group, the number of layers corresponding to a physical downlink shared channel (PDSCH) of the first receiving end, and the number of codewords corresponding to the PDSCH of the first receiving end.

S2, the first receiving end processes data according to the range of the DMRS ports occupied by the one or more second receiving ends.

Optionally, in this embodiment, the above storage medium may include, but is not limited to, various storage medium for storing program code, such as a U disk, a Read-Only Memory (ROM), a Random Access Memory (RAM), a removable hard disk, a magnetic disk, a disc or optical disc.

Optionally, in this embodiment, the processor executes the foregoing steps S1-S2 according to the program code stored in the storage medium.

Optionally, the specific examples in this embodiment may refer to the examples described in the above embodiments and alternative embodiments, and it will no longer be described in this embodiment.

With the method for determining the occupancy of DMRS ports of other MU-MIMO users provided in the embodiment of the present disclosure, the effects of reducing the complexity of the blind detection of the OCC length of the receiving end and improving the channel estimation performance of the receiving end and the demodulation reception performance of the receiving end are achieved, while effectively saving the DCI overhead.

Obviously, those skilled in the art should understand that the above modules or steps of the present application can be implemented by a general-purpose computing device, which may be concentrated on a single computing device or distributed over a network of multiple computing devices. Alternatively, they may be implemented with program code that is executable by the computing device so that they may be stored in a storage device and executed by a computing device, and in some cases, the steps shown or described may be performed in a different order other than this, or they may be separately made into individual integrated circuit modules, or multiple modules or steps in them are made into a single integrated circuit module. Thus, the present application is not limited to any specific combination of hardware and software.

The foregoing descriptions are merely embodiments of the present application and are not intended to limit the present application. For those skilled in the art, the present application may have various changes and variations. Any amendments, equivalent substitutions, improvements etc. within the spirit and principles of this application shall be included in the scope of protection of this application.

INDUSTRIAL APPLICABILITY

An embodiment of the present disclosure provides a data processing method and apparatus, so as to at least solve the problems in the prior art that blind detection of the OCC length is complex, channel estimation performance of the receiving end is low, and demodulation reception performance of the receiving end is low due to the case that the receiving end cannot confirm DMRS port occupation situations of other receiving ends.

The method includes: a first receiving end determines a range of data demodulation reference signal (DMRS) ports occupied by one or more second receiving ends by using at least one of the following information: a usage state of a joint encoding table corresponding to a DMRS port group, the number of layers corresponding to a physical downlink shared channel (PDSCH) of the first receiving end, and the number of codewords corresponding to the PDSCH of the first receiving end; and the first receiving end processes data according to the range of the DMRS ports occupied by the one or more second receiving ends.

The problems in the prior art that blind detection of the OCC length is complex, channel estimation performance of the receiving end is low, and demodulation reception performance of the receiving end is low due to the case that the receiving end cannot confirm DMRS port occupation situations of other receiving ends is solved by this application. Therefore, the effects of reducing the complexity of the blind detection of the OCC length of the receiving end and improving the channel estimation performance of the receiving end and the demodulation reception performance of the receiving end are achieved.

What is claimed is:

1. A data processing method, comprising:
   determining, by a first receiving end, a range of data demodulation reference signal (DMRS) ports occupied by at least one second receiving end by using at least one of the following information: a usage state of a joint encoding table corresponding to a DMRS port group, the number of layers corresponding to a physical downlink shared channel (PDSCH) of the first receiving end, or the number of codewords corresponding to the PDSCH of the first receiving end; and
   processing, by the first receiving end, PDSCH demodulation according to the range of the DMRS ports occupied by the at least one second receiving end;
   wherein the range of the DMRS ports occupied by the at least one second receiving end is a subset of the DMRS port group;
   wherein when the joint encoding table corresponds to a plurality of DMRS port groups, determining, by the first receiving end, one DMRS port group which includes the range of the DMRS ports occupied by the at least one second receiving end from the plurality of DMRS port groups according to a dynamic indication information from a transmitting end.

2. The method according to claim 1, wherein
   when the information used by the first receiving end comprises the usage state of the joint encoding table, the number of the layers corresponding to the PDSCH of the first receiving end, and the number of the codewords corresponding to the PDSCH of the first receiving end, determining, by the first receiving end, the range of the DMRS ports occupied by the at least one second receiving end comprises:
   determining, by the first receiving end, the range of the DMRS ports occupied by the at least one second receiving end according to the DMRS port group occupied by the at least one second receiving end, wherein:
   when a joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the at least one second receiving end is one of a first DMRS port group or a second DMRS port group;
   when the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the at least one second receiving end is one of the first DMRS port group or the second DMRS port group;
   when a joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the at least one second receiving end is one of a third DMRS port group or a fourth DMRS port group;
   when the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end are a subset of the third DMRS port group or are a subset of the fourth DMRS port group, the DMRS port group occupied by the at least one second receiving end is one of the third DMRS port group or the fourth DMRS port group;
   other than the above cases, the DMRS port group occupied by the at least one second receiving end is an empty set;
   wherein, the X11, the X12, the X21 and the X22 are all positive integers; the X11, the X12, the first DMRS port group and the second DMRS port group are all determined according to the joint encoding table 1, and the X21, the X22, the third DMRS port group and the fourth DMRS port group are all determined according to the joint encoding table 2; and wherein the joint encoding table 1 and the joint encoding table 2 are two different joint encoding tables, and the joint encoding table is a table comprising at least two of the number of the layers corresponding to the PDSCH of the first receiving end, a DMRS port occupied by the first receiving end, and a DMRS scrambling code identification $n_{scid}$ of the DMRS port occupied by the first receiving end, and a currently-used table is determined by the first receiving end according to first indication information from the transmitting end.

3. The method according to claim 2, wherein:
   when the DMRS port group occupied by the at least one second receiving end is one of the first DMRS port group or the second DMRS port group, the DMRS port group occupied by the at least one second receiving end is determined by the first receiving end according to third indication information from the transmitting end; and/or
   when the DMRS port group occupied by the at least one second receiving end is one of the third DMRS port group or the fourth DMRS port group, the DMRS port group occupied by the at least one second receiving end is determined by the first receiving end according to fourth indication information from the transmitting end.

4. The method according to claim 2, further comprising at least one of:
   configuring the first DMRS port group and the second DMRS port group corresponding to the joint encoding table 1 according to fifth indication information from the transmitting end; or configuring the third DMRS port group and the fourth DMRS port group corresponding to the joint encoding table 2 according to sixth indication information from the transmitting end.

5. The method according to any claim 2, wherein:
the first DMRS port group and the third DMRS port group are both {7,8}, and the second DMRS port group and the fourth DMRS port group are both {7,8,11,13}.

6. The method according to claim 2, wherein:
determining, by the first receiving end, the range of the DMRS ports occupied by the at least one second receiving end according to the DMRS port group occupied by the at least one second receiving end, comprises at least one of:
determining that all ports in the DMRS port group occupied by the at least one second receiving end are the range of the DMRS ports occupied by the at least one second receiving end, wherein initialization parameters of a scrambling sequence of the DMRS ports occupied by the at least one second receiving end and initialization parameters of a scrambling sequence of the DMRS port occupied by the first receiving end meet the following conditions: $n_{scid,2}=1-n_{scid,1}$, $n_{ID,1}^{n_{scid,3}}=n_{ID,2}^{n_{scid,2}}$, $n_{s,1}=n_{s,2}$, wherein $n_{scid,1}$, $n_{ID,1}^{n_{scid,2}}$ and $n_{s,1}$ are respectively a scrambling code identification, a virtual cell identification and a time unit number corresponding to the DMRS port of the first receiving end; and $n_{scid,2}$, $n_{ID,2}^{n_{scid,2}}$, and $n_{s,2}$ are respectively a scrambling code identification, a virtual cell identification and a time unit number corresponding to the DMRS ports of the at least one second receiving end;
or
determining that ports in the DMRS port group occupied by the at least one second receiving end which are different from the DMRS port occupied by the first receiving end are the range of the DMRS ports occupied by the at least one second receiving end, wherein the scrambling sequence of the DMRS ports occupied by the at least one second receiving end and the scrambling sequence of the DMRS port occupied by the first receiving end are the same, but orthogonal codes of the DMRS ports occupied by the at least one second receiving end and orthogonal codes of the DMRS port occupied by the first receiving end are different.

7. The method according to claim 1, wherein:
when the information used by the first receiving end comprises the usage state of the joint encoding table, determining, by the first receiving end, the range of the DMRS ports occupied by the at least one second receiving end comprises:
determining, by the first receiving end, the range of the DMRS ports occupied by the at least one second receiving end according to the usage state of the joint encoding table and DMRS port occupied by the first receiving end.

8. The method according to claim 7, wherein:
determining, by the first receiving end, the range of the DMRS ports occupied by the at least one second receiving end according to the usage state of the joint encoding table and the DMRS port occupied by the first receiving end comprises:
determining, by the first receiving end, the range of the DMRS ports occupied by the at least one second receiving end according to the DMRS port group occupied by the at least one second receiving end, wherein:
when a joint encoding table 1 is used by the first receiving end, and the DMRS port occupied by the first receiving end is a subset of a first DMRS port group or is a subset of a second DMRS port group, the DMRS port group occupied by the at least one second receiving end is one of the first DMRS port group or the second DMRS port group;
when a joint encoding table 2 is used by the first receiving end, and the DMRS port occupied by the first receiving end is a subset of a third DMRS port group or is a subset of a fourth DMRS port group, the DMRS port group occupied by the at least one second receiving end is one of the third DMRS port group or the fourth DMRS port group;
wherein, the first DMRS port group and the second DMRS port group are determined according to the joint encoding table 1, and the third DMRS port group and the fourth DMRS port group are determined according to the joint encoding table 2; wherein the joint encoding table 1 and the joint encoding table 2 are two different joint encoding tables, and the joint encoding table is a table comprising at least two of: the number of the layers corresponding to the PDSCH of the first receiving end, the DMRS port occupied by the first receiving end, and a DMRS scrambling code identification $n_{scid}$ of the DMRS port occupied by the first receiving end, and a currently-used table is determined by the first receiving end according to second indication information from a transmitting end.

9. A data processing apparatus comprising:
a determiner configured to determine a range of data demodulation reference signal (DMRS) ports occupied by at least one second receiving end by using at least one of the following information: a usage state of a joint encoding table corresponding to a DMRS port group, the number of layers corresponding to a physical downlink shared channel (PDSCH) of a first receiving end, or the number of codewords corresponding to the PDSCH of the first receiving end; and
a processor configured to process PDSCH demodulation according to the range of the DMRS ports occupied by the at least one second receiving end;
wherein the range of the DMRS ports occupied by the at least one second receiving end is a subset of the DMRS port group;
wherein when the joint encoding table corresponds to a plurality of DMRS port groups, determiner is configured to determine one DMRS port group which includes the range of the DMRS ports occupied by the at least one second receiving end from the plurality of DMRS port groups according to a dynamic indication information from a transmitting end.

10. The apparatus according to claim 9, wherein:
when the information used by the first receiving end comprises the usage state of the joint encoding table, the number of the layers corresponding to the PDSCH of the first receiving end, and the number of the codewords corresponding to the PDSCH of the first receiving end, the determiner is configured to:
determine the range of the DMRS ports occupied by the at least one second receiving end according to the DMRS port group occupied by the at least one second receiving end, wherein:
when a joint encoding table 1 is used by the first receiving end, the number of the codewords corresponding to the PDSCH of the first receiving end is 1, and the number of the layers corresponding to the PDSCH of the first receiving end is less than or equal to X11, the DMRS port group occupied by the at least one second receiving end is one of a first DMRS port group or a second DMRS port group;

when the joint encoding table 1 is used by the first receiving end, the number of the codewords corresponding to the PDSCH of the first receiving end is 2, and the number of the layers corresponding to the PDSCH of the first receiving end is less than or equal to X12, the DMRS port group occupied by the at least one second receiving end is one of the first DMRS port group or the second DMRS port group;

when a joint encoding table 2 is used by the first receiving end, the number of the codewords corresponding to the PDSCH of the first receiving end is 1, and the number of the layers corresponding to the PDSCH of the first receiving end is less than or equal to X21, the DMRS port group occupied by the at least one second receiving end is one of a third DMRS port group or a fourth DMRS port group;

when the joint encoding table 2 is used by the first receiving end, the number of the codewords corresponding to the PDSCH of the first receiving end is 2, the number of the layers corresponding to the PDSCH of the first receiving end is less than or equal to X22, and all DMRS ports of the first receiving end is a subset of the third DMRS port group or is a subset of the fourth DMRS port group, the DMRS port group occupied by the at least one second receiving end is one of the third DMRS port group or the fourth DMRS port group;

other than the above cases, the DMRS port group occupied by the at least one second receiving end is an empty set;

wherein, the X11, the X12, the X21, and the X22 are all positive integers; the X11, the X12, the first DMRS port group, and the second DMRS port group are all determined according to the joint encoding table 1, and the X21, the X22, the third DMRS port group, and the fourth DMRS port group are all determined according to the joint encoding table 2; and wherein the joint encoding table 1 and the joint encoding table 2 are two different joint encoding tables, and the joint encoding table is a table comprising at least two of: the number of the layers corresponding to the PDSCH of the first receiving end, a DMRS port occupied by the first receiving end, and a DMRS scrambling code identification $n_{scid}$ of the DMRS port occupied by the first receiving end, and a currently-used table is determined by the first receiving end according to first indication information from the transmitting end.

11. The apparatus according claim 10, wherein:
when the DMRS port group occupied by the at least one second receiving end is one of the first DMRS port group or the second DMRS port group, the first receiving end determines the DMRS port group occupied by the at least one second receiving end according to third indication information from the transmitting end; and
when the DMRS port group occupied by the at least one second receiving end is one of the third DMRS port group or the fourth DMRS port group, the first receiving end determines the DMRS port group occupied by the at least one second receiving end according to fourth indication information from the transmitting end.

12. The apparatus according to claim 10, wherein:
the first DMRS port group and the second DMRS port group corresponding to the joint encoding table 1 are configured according to fifth indication information from the transmitting end; and/or
the third DMRS port group and the fourth DMRS port group corresponding to the joint encoding table 2 are configured according to sixth indication information from the transmitting end.

13. The apparatus according to claim 10, wherein:
the first DMRS port group and the third DMRS port group are both {7,8}, and the second DMRS port group and the fourth DMRS port group are both {7,8,11,13}.

14. The apparatus according to claim 10, wherein the determiner is further configured to determine the range of the DMRS ports occupied by the at least one second receiving end according to the DMRS port group occupied by the at least one second receiving end by at least one of:
determining that all ports in the DMRS port group occupied by the at least one second receiving end are the range of the DMRS ports occupied by the at least one second receiving end, wherein initialization parameters of a scrambling sequence of the DMRS ports occupied by the at least one second receiving end and initialization parameters of a scrambling sequence of the DMRS port occupied by the first receiving end meet the following conditions:

$$n_{scid,2}=1-n_{scid,1}, n_{ID,1}^{n_{scid,3}}=n_{ID,2}^{n_{scid,2}}, n_{s,1}=n_{s,2};$$

wherein, $n_{scid,1}$, $n_{ID,1}^{n_{scid,1}}$, and $n_{s,1}$ are a scrambling code identification, a virtual cell identification and a time unit number, respectively, corresponding to the DMRS port of the first receiving end; and $n_{scid,2}$, $n_{ID,2}^{n_{scid,2}}$, and $n_{s,2}$ are a scrambling code, a virtual cell identification and a time unit number, respectively, corresponding to the DMRS ports of the at least one second receiving end;

or determining that ports in the DMRS port group occupied by the at least one second receiving end which are different from the DMRS port occupied by the first receiving end are the range of the DMRS ports occupied by the at least one second receiving end, wherein the scrambling sequence of the DMRS ports occupied by the at least one second receiving end and the scrambling sequence of the DMRS port occupied by the first receiving end are the same, but orthogonal codes of the DMRS ports occupied by the at least one second receiving end and orthogonal codes of the DMRS port occupied by the first receiving end are different.

15. The apparatus according to claim 9, wherein:
when the information used by the first receiving end at least comprises the usage state of the joint encoding table, the determiner is configured to:
determine the range of the DMRS ports occupied by the at least one second receiving end according to the usage state of the joint encoding table and the DMRS port occupied by the first receiving end.

16. The apparatus according to claim 15, wherein the determiner is configured to determine the range of the DMRS ports occupied by the at least one second receiving end by:
determining the range of the DMRS ports occupied by the at least one second receiving end according to the DMRS port group occupied by the at least one second receiving end, wherein:

when a joint encoding table 1 is used by the first receiving end, and the DMRS port occupied by the first receiving end is a subset of a first DMRS port group or is a subset of a second DMRS port group, the DMRS port group occupied by the at least one second receiving end is one of the first DMRS port group or the second DMRS port group;

when a joint encoding table 2 is used by the first receiving end, and the DMRS port occupied by the first receiving end is a subset of a third DMRS port group or is a subset of a fourth DMRS port group, the DMRS port group occupied by the at least one second receiving end is one of the third DMRS port group or the fourth DMRS port group;

wherein, the first DMRS port group and the second DMRS port group are determined according to the joint encoding table 1, and the third DMRS port group and the fourth DMRS port group are determined according to the joint encoding table 2;

wherein the joint encoding table 1 and the joint encoding table 2 are two different joint encoding tables, and the joint encoding table is a table comprising at least two of: the number of the layers corresponding to the PDSCH of the first receiving end, the DMRS port occupied by the first receiving end, and a DMRS scrambling code identification $n_{scid}$ of the DMRS port occupied by the first receiving end, and a currently-used table is determined by the first receiving end according to second indication information from a transmitting end.

17. A non-transitory storage medium, configured to store program instructions that, when executed by a processor, cause the processor to execute a method comprising:

determining a range of DMRS ports occupied by at least one second receiving end according to at least one of the following information: a usage state of a joint encoding table corresponding to a DMRS port group, the number of layers corresponding to a PDSCH of the first receiving end, or the number of codewords corresponding to the PDSCH of the first receiving end; and processing PDSCH demodulation according to the range of the DMRS ports occupied by the at least one second receiving end;

wherein the range of the DMRS ports occupied by the at least one second receiving end is a subset of the DMRS port group;

wherein when the joint encoding table corresponds to a plurality of DMRS port groups, determining, one DMRS port group which includes the range of the DMRS ports occupied by the at least one second receiving end from the plurality of DMRS port groups according to a dynamic indication information from a transmitting end.

* * * * *